United States Patent
Kim et al.

(10) Patent No.: US 12,428,584 B2
(45) Date of Patent: Sep. 30, 2025

(54) CERIUM OXIDE ABRASIVE PARTICLES AND POLISHING SLURRY COMPOSITION

(71) Applicant: KCTECH CO., LTD., Gyeonggi-do (KR)

(72) Inventors: Jung Hun Kim, Gyeonggi-do (KR); Jeong Gyu Lee, Gyeonggi-do (KR); Hyo Jun Jang, Gyeonggi-do (KR)

(73) Assignee: KCTECH CO., LTD., Gyeonggi-do (KR)

( * ) Notice: Subject to any disclaimer, the term of this patent is extended or adjusted under 35 U.S.C. 154(b) by 286 days.

(21) Appl. No.: 17/897,222

(22) Filed: Aug. 29, 2022

(65) Prior Publication Data

US 2023/0072716 A1    Mar. 9, 2023

(30) Foreign Application Priority Data

Aug. 30, 2021 (KR) .......................... 10-2021-0114719

(51) Int. Cl.
*C09G 1/02* (2006.01)
*C09K 3/14* (2006.01)

(52) U.S. Cl.
CPC .............. *C09K 3/1409* (2013.01); *C09G 1/02* (2013.01)

(58) Field of Classification Search
None
See application file for complete search history.

(56) References Cited

U.S. PATENT DOCUMENTS

| | | | | |
|---|---|---|---|---|
| 6,303,091 B1* | 10/2001 | Mohri | ..................... | C01G 15/00 |
| | | | | 423/608 |
| 2017/0081554 A1* | 3/2017 | Tsuchiya | .............. | C09K 3/1463 |
| 2021/0207002 A1* | 7/2021 | Iwano | .................. | C09K 3/1463 |
| 2021/0246346 A1* | 8/2021 | Hasegawa | ............. | B24B 37/042 |

FOREIGN PATENT DOCUMENTS

| | | |
|---|---|---|
| CN | 1821339 | 8/2006 |
| CN | 101006153 | 7/2007 |
| CN | 101258106 | 9/2008 |
| CN | 101291778 | 10/2008 |
| CN | 101683999 | 3/2010 |
| CN | 101792171 | 8/2010 |
| CN | 102757081 | 10/2012 |
| CN | 103571334 | 2/2014 |
| CN | 105800660 | 7/2016 |
| CN | 108017081 | 5/2018 |
| CN | 108975380 | 12/2018 |
| CN | 112494513 | 3/2021 |
| CN | 113247941 | 8/2021 |
| KR | 20050060213 | 6/2005 |
| KR | 100512134 | 9/2005 |
| KR | 101139110 | 7/2012 |
| KR | 20170003147 | 1/2017 |
| KR | 20190063989 | 6/2019 |

* cited by examiner

*Primary Examiner* — Shamim Ahmed
(74) *Attorney, Agent, or Firm* — JCIPRNET

(57) ABSTRACT

The present disclosure relates to cerium oxide abrasive particles and a polishing slurry composition, and more particularly, to cerium oxide abrasive particles comprising: an element cerium; and a modifier and satisfying the agglomeration ratios calculated from the relational expressions of the primary particle sizes and the secondary particle sizes, and a polishing slurry composition comprising the same.

11 Claims, No Drawings

CERIUM OXIDE ABRASIVE PARTICLES AND POLISHING SLURRY COMPOSITION

CROSS-REFERENCE TO RELATED APPLICATION

This application claims the benefit of Korean Patent Application No. 10-2021-0114719 filed on Aug. 30, 2021, in the Korean Intellectual Property Office, the entire disclosure of which is incorporated herein by reference for all purposes.

BACKGROUND

1. Field of the Invention

One or more example embodiments relate to nano-cerium oxide abrasive particles and a polishing slurry composition comprising the same.

2. Description of the Related Art

A chemical mechanical polishing (CMP) process is performed by injecting a slurry containing abrasive particles onto a substrate and using a polishing pad mounted on a polishing device. At this time, the abrasive particles receive pressure from the polishing device to mechanically polish the surface, and chemical components contained in the polishing slurry composition chemically react the surface of the substrate to chemically remove a surface portion of the substrate.

In general, there are various types of polishing slurry compositions depending on the type and characteristics of an object to be removed. Among them, a polishing slurry composition for selectively removing a specific film to be polished is very diverse, but in recent semiconductor device structures, a slurry composition capable of simultaneously polishing a silicon oxide film, a silicon nitride film, and a polysilicon film is required. However, the conventional slurry composition cannot selectively polish a silicon oxide film, a silicon nitride film, and a polysilicon film, and there are problems in that a desired level of polishing rate is not obtained, defects and scratches occur, and agglomeration occurs due to low dispersion stability. Further, when cerium oxide particles have an angular crystal grain shape and a wide particle diameter distribution, micro-scratches of the polysilicon film occur unavoidably. Further, in order to improve the defects and scratches of the polishing film, and to improve the dishing and erosion values in the pattern, the necessity of applying small-sized particles is increasing.

In the case of a cerium oxide nanoparticle synthesis technology (Rhodia's Patent 10-1139110), it is comprised of the steps of adding a base to a cerium salt to obtain a precipitate, heat-treating the produced precipitate under an inert atmosphere, and acidifying and cleaning the medium obtained by heat treatment to obtain a suspension. The cerium oxide nanoparticles prepared in the above manner have a disadvantage in that the precipitate generated by the addition of the base constitutes an interparticle agglomerate due to its pH, and this agglomerate is difficult to disintegrate again by acidification and cleaning.

In the case of a patent to which nano-cerium oxide particles are applied (Hitachi Patent 10-0512134), it is shown that the particles have a small primary particle size, but they have a large secondary particle size.

In order to disperse nanoparticles, various processes are performed, or chemical addition and treatment are required. During synthesis, nanoparticles have a size of several nanometers, but agglomeration occurs in an aqueous solution to result in an increase in the particle size. The smaller the particle size, the stronger this agglomeration phenomenon, and there is a problem in that it is difficult to redistribute the particles that have been agglomerated once. Therefore, it is necessary to provide cerium oxide nanoparticles in which interparticle agglomeration is prevented and excellent dispersion phase is maintained, and a polishing slurry composition comprising the same.

SUMMARY

In order to solve the above-mentioned problems, example embodiments provide nano-cerium oxide abrasive particles having uniform dispersibility by suppressing agglomeration using secondary particles, and provide a polishing slurry composition capable of improving dispersibility and polishing rate of polishing film by using the same.

However, the problems to be solved by the present disclosure are not limited to those mentioned above, and other problems not mentioned will be clearly understood by those skilled in the art from the following description.

According to an aspect, there is provided cerium oxide abrasive particles comprising: an element cerium; and a modifier, and having an agglomeration ratio (A) of 1.5 to 2.5 according to Equation 1 below.

$$A = [\text{Secondary particle size}]/[\text{Primary particle size}] \quad \text{[Equation 1]}$$

(In Equation 1, the primary particle size is an r value of Equation 2, and the secondary particle size is a value measured by a dynamic light scattering (DLS) method.)

$$S_0 = \frac{3}{rp} \text{cm}^2/g \quad \text{[Equation 2]}$$

(In Equation 2, $S_0$ is a specific surface area, r is a radius of the particles, and p is a density of the material.)

According to one example embodiment of the present disclosure, the abrasive particles may have a specific surface area (BET) of 31 $m^2/g$ or more.

According to one example embodiment of the present disclosure, the primary particle size according to Equation 2 above may be 25 nm or less.

According to one example embodiment of the present disclosure, the secondary particle size of the abrasive particles may be 5 nm to 50 nm.

According to one example embodiment of the present disclosure, the abrasive particles may have a density of 6.7 $g/cm^3$ to 7.7 $g/cm^3$.

According to one example embodiment of the present disclosure, the modifier may be contained in a concentration of 0.01 M to 1 M.

According to one example embodiment of the present disclosure, the molar ratio of the element cerium to the modifier may be 1:0.1 to 1:1.

According to one example embodiment of the present disclosure, the modifier may include at least one selected from the group consisting of a nonionic compound and a polysaccharide.

According to one example embodiment of the present disclosure, the nonionic compound may include at least one selected from the group consisting of polyethylene glycol (PEG), polypropylene glycol (PPG), polyvinylpyrrolidone (PVP), polyglycerol, polyvinyl alcohol (PVA), ethylene oxide-propylene oxide copolymer, polyethylene-propylene copolymer, polyalkyl oxide, polyoxyethylene oxide (PEO), polyethylene oxide, and polypropylene oxide.

According to one example embodiment of the present disclosure, the polysaccharide may include at least one selected from the group consisting of dextran, dextrin, maltodextrin, cyclodextrin (e.g., α-cyclodextrin, β-cyclodextrin, γ-cyclodextrin), amylodextrin, glycogen, and inulin.

According to one example embodiment of the present disclosure, there is provided a polishing slurry composition comprising cerium oxide abrasive particles.

According to one example embodiment of the present disclosure, the abrasive particles may be contained in an amount of 0.01% by weight to 5% by weight in the slurry composition.

According to one example embodiment of the present disclosure, the polishing slurry composition may further comprise a pH adjuster.

According to one example embodiment of the present disclosure, the pH adjuster may include an acidic material including at least one selected from the group consisting of hydrochloric acid, sulfuric acid, nitric acid, nitrous acid, persulfuric acid, sulfurous acid, hyposulfurous acid, boronic acid, phosphoric acid, phosphorous acid, hypophosphorous acid, superphosphoric acid, perchloric acid, chlorous acid, hypochlorous acid, bromic acid, bromous acid, hypobromous acid, perbromic acid, iodic acid, hypoiodous acid, periodic acid, hydrogen fluoride, boron trifluoride, tetrafluoroboric acid, hydrofluoric acid, formic acid, malonic acid, maleic acid, oxalic acid, adipic acid, citric acid, acetic acid, propionic acid, fumaric acid, salicylic acid, pimelinic acid, benzoic acid, succinic acid, phthalic acid, butyric acid, glutaric acid, glutamic acid, glycolic acid, lactic acid, aspartic acid, tartaric acid, and salts thereof.

According to one example embodiment of the present disclosure, the polishing slurry composition may have a pH of 2 to 11.

According to one example embodiment of the present disclosure, the polishing slurry composition may have a positive zeta potential.

Additional aspects of example embodiments will be set forth in part in the description which follows and, in part, will be apparent from the description, or may be learned by practice of the disclosure.

According to example embodiments, abrasive particles with almost monodispersity having a high ratio of primary particles (as-prepared particles) obtained during synthesis are obtained, and a polishing slurry composition comprising the same is provided, wherein the abrasive particles or the polishing slurry composition may provide excellent polishing rate characteristics while having excellent dispersibility through primary dispersion.

DETAILED DESCRIPTION

Hereinafter, example embodiments of the present disclosure will be described in detail. When it is determined detailed description related to a related known function or configuration, they may make the gist of the present disclosure unnecessarily ambiguous in describing the present disclosure, the detailed description will be omitted. Also, terms used in the present specification, as terms used to appropriately describe preferred embodiments of the present disclosure, may be changed depending on a user, the intent of an operator, a custom of a field to which the present disclosure pertains, or the like. Accordingly, definitions of the present terms should be made based on the contents throughout the present specification.

Throughout the specification, when any member is positioned "on" the other member, this not only includes a case that the any member is brought into contact with the other member, but also includes a case that another member exists between two members.

Throughout the specification, if a prescribed part "includes" a prescribed element, this means that another element can be further included instead of excluding another element.

Hereinafter, the present disclosure will be described in detail with reference to Example Embodiments with respect to the cerium oxide abrasive particles and the polishing slurry composition. However, the present disclosure is not limited to these Example Embodiments.

The present disclosure relates to cerium oxide abrasive particles, and according to one example embodiment of the present disclosure, the cerium oxide abrasive particles may comprise: an element cerium; and a modifier.

In the present disclosure, the cerium oxide corresponds to cerium oxide or cerium (IV) oxide, and according to one example embodiment of the present disclosure, the cerium oxide abrasive particles may satisfy a particle agglomeration ratio of 1.5 to 2.5 according to Equation 1 below.

The particle agglomeration ratio can predict the primary particle size of the particles through BET analysis that can analyze the specific surface area of the particles in order to measure the dispersibility of the particles, and since the synthesized nanoparticles are close to a spherical shape, the correlation between the specific surface area and the primary particle size of the particles may be calculated by Equation (2) below.

The ratio of the calculated primary particle size of the particles to the secondary particle size calculated through dynamic light scattering (DLS) analysis is calculated and defined as the particle agglomeration ratio, and when the particle agglomeration ratio is included within the range, the cerium oxide abrasive particles are defined as very homogeneously dispersed particles, and may have almost monodispersion properties.

In order to achieve the dispersion of conventional nanoparticles in the polishing slurry composition, several processes should be added, or chemicals or the like should be added, but the cerium oxide abrasive particles according to the present disclosure may provide dispersibility without these processes or chemicals, and may give a help in the improvement of the polishing rate of the polishing slurry composition.

$$A = [\text{Secondary particle size}]/[\text{Primary particle size}] \quad \text{[Equation 1]}$$

In Equation 1, the primary particle size is an r value of Equation 2 below, and the secondary particle size may be a value measured by a dynamic light scattering (DLS) method.

$$S_0 = \frac{3}{rp} \text{cm}^2/g \quad \text{[Equation 2]}$$

(In Equation 2, $S_0$ is a specific surface area, r is a radius of the particles, and p is a density of the material.)

For example, if particles satisfy the value according to Equation 1 by substituting the primary particle size calculated by BET according to Equation 1 above and the secondary particle size by a particle size analysis method of the DLS method, the particles may be defined as monodispersed particles, when agglomeration of the particles occurs, the value of Equation 1 exceeds 2.5, and when they are applied to the polishing slurry composition, defects such as polishing rate deterioration, and scratches of the polishing film may occur.

For example, in order to obtain the value of Equation 1 above, the two measurement methods may perform measurement by applying the same dispersion process and the same energy to disperse the particles. For example, the particles are dispersed under the same conditions of the speed (RPM), the bead size, time, and the like during the milling process so that the BET specific surface area and particle size may be analyzed, and related values may be substituted in Equations 1 and 2.

According to one example embodiment of the present disclosure, a method for preparing the cerium oxide abrasive particles are not particularly limited as long as it is a metal oxide particle-preparation method known in the art of the present disclosure, but may preferably include a hydrothermal synthesis method, a sol-gel method, a precipitation method, a coprecipitation method, a hydrothermal synthesis method, a filtering method, an aging method, a spray drying method, a thermal evaporation method, etc., and the particles may be prepared using a cerium trivalent precursor such as cerium nitride, cerium acetate, or cerium sulfate. The particles synthesized by the above method may have a nano size.

For example, the cerium oxide abrasive particles may have a primary particle size of 25 nm or less; 1 nm to 25 nm; or 2 nm to 20 nm, and the cerium oxide abrasive particles may have a secondary particle size of 5 nm to 50 nm; or 10 nm to 40 nm. When the cerium oxide abrasive particles are included in the above particle size ranges, dispersion stability in the polishing composition may be excellent, performance deterioration in a long-term polishing process may be prevented, and polishing rate may be improved.

According to one example embodiment of the present disclosure, the cerium oxide abrasive particles are surface-modified with a nonionic compound during the synthesis process, this may prevent agglomeration between particles to prevent agglomeration into secondary particles and to provide particle dispersibility at or close to a monodisperse level, which may improve the polishing rate by maintaining particle dispersibility in the polishing slurry composition. For example, the nonionic compound is a compound having nonionic properties in an aqueous solution state, and particles with good dispersibility due to a steric hindrance effect between particles using the nonionic compound as a template in the cerium oxide particle synthesis step are provided, and this may give the steric hindrance effect between the particles during synthesis, thereby suppressing agglomeration between the particles.

According to one example embodiment of the present disclosure, the cerium oxide abrasive particles may have a specific surface area of 31 $m^2/g$ or more; 40 $m^2/g$ or more; 31 $m^2/g$ to 200 $m^2/g$; or 40 $m^2/g$ to 150 $m^2/g$, and when the cerium oxide abrasive particles are included within the above specific surface area range, the area of the contact portion with the polishing target film may be sufficiently secured to provide a high level of polishing rate, and scratches and dishing occurring on the surface of the polishing target film may be lowered. The specific surface area may be measured by a Brunauer-Emmett-Teller (BET) method. For example, it can be measured by the BET 6-point method by the nitrogen gas adsorption flow method using a porosimetry analyzer (Bell Japan Inc, Belsorp-II mini).

According to one example embodiment of the present disclosure, the abrasive particles may have a density of 6.7 $g/cm^3$ to 7.7 $g/cm^3$.

According to one example embodiment of the present disclosure, the modifier may be contained in a concentration of 0.01 M to 1 M, and when it is contained within the above range, it is possible to increase the polishing process participation rate of the abrasive particles and improve the polishing rate.

According to one example embodiment of the present disclosure, the molar ratio of the element cerium to the modifier may be 1:0.1 to 1:10; or 1:0.5 to 1:5.

According to one example embodiment of the present disclosure, the cerium oxide abrasive particles are prepared by mixing the cerium trivalent precursor and the modifier, and the molar ratio of the cerium trivalent precursor to the modifier may be 1:0.1 to 1:10; or 1:0.5 to 1:5.

According to one example embodiment of the present disclosure, the modifier may include at least one selected from the group consisting of a nonionic compound and a polysaccharide.

According to one example embodiment of the present disclosure, the nonionic compound may include at least one selected from the group consisting of polyethylene glycol (PEG), polypropylene glycol (PPG), poly(isopropylene glycol), polybutylene glycol, polyvinyl pyrrolidone (PVP), polyglycerol, polyvinyl alcohol (PVA), polyoxyethylene methyl ether, polyethylene oxide-polypropylene oxide copolymer, poly(ethylene glycol)-end capped poly(propylene glycol) (PEG-PPG-PEG block copolymer), polyethylene-propylene copolymer, polyalkyl oxide, polyoxyethylene oxide (PEO), polyethylene oxide, and polypropylene oxide.

According to one example embodiment of the present disclosure, the nonionic compound may have a weight average molecular weight of 3,000 or less; 2,500 or less; or 2,000 or less, or 100 or more; 200 or more; or 300 or more.

According to one example embodiment of the present disclosure, the polysaccharide is a polymeric carbohydrate molecule composed of a long chain of monosaccharide units linked by glycosidic bonds, and may include at least one selected from the group consisting of, for example, dextran, dextrin, maltodextrin, cyclodextrin (e.g., α-cyclodextrin, β-cyclodextrin, and γ-cyclodextrin), amylodextrin, glycogen, and inulin.

The present disclosure relates to a polishing slurry composition comprising the cerium oxide abrasive particles according to the present disclosure, and may further comprise a pH adjuster.

According to one example embodiment of the present disclosure, the cerium oxide abrasive particles may be contained in an amount of 0.01 to 5% by weight; 0.05 to 2% by weight; or 0.05 to 1% by weight in the polishing slurry composition. If the content of the abrasive particles is less than 0.01% by weight, it is difficult to secure a high level of polishing rate, and if it exceeds 5% by weight, dispersion stability of the abrasive particles is lowered, the occurrence of defects increases, and it may be difficult to obtain an effect of reducing the occurrence of dishing.

According to one example embodiment of the present disclosure, the pH adjuster may include an acidic material including at least one selected from the group consisting of hydrochloric acid, sulfuric acid, nitric acid, nitrous acid, persulfuric acid, sulfurous acid, hyposulfurous acid, boronic acid, phosphoric acid, phosphorous acid, hypophosphorous acid, superphosphoric acid, perchloric acid, chlorous acid, hypochlorous acid, bromic acid, bromous acid, hypobromous acid, perbromic acid, iodic acid, hypoiodous acid, periodic acid, hydrogen fluoride, boron trifluoride, tetrafluoroboric acid, hydrofluoric acid, formic acid, malonic acid, maleic acid, oxalic acid, adipic acid, citric acid, acetic acid, propionic acid, fumaric acid, salicylic acid, pimelinic acid, benzoic acid, succinic acid, phthalic acid, butyric acid, glutaric acid, glutamic acid, glycolic acid, lactic acid, aspartic acid, tartaric acid, and salts thereof. For example, the pH adjuster may be used in an amount suitable for adjusting the pH of the polishing slurry composition to a pH range of 2 to 11, preferably a pH range of 4 to 7.

According to one example embodiment of the present disclosure, the polishing slurry composition may have a positive zeta potential within a pH range of 2 to 11, for example, 10 mV to 100 mV.

According to one example embodiment of the present disclosure, the polishing slurry composition may be dispersed using particle dispersing equipment known in the art of the present disclosure, and for example, Homomix, ball mill, milling, and ultrasonic dispersion may be used.

According to one example embodiment of the present disclosure, the polishing slurry composition may be used in a CMP polishing process of a semiconductor wafer including at least one film among a silicon nitride film, a silicon oxide film, a polysilicon film, and a silicon film. The polishing slurry composition may be used in a process of removing a silicon oxide film at a high polishing rate, or a process of stopping polishing on a polysilicon film or a silicon nitride film while removing the silicon oxide film at a high polishing rate. In the polishing process, a polishing rate for the silicon oxide film may be 2,000 Å/min to 6,000 Å/min.

Hereinafter, the present disclosure will be described in more detail through Example Embodiments, but the following Example Embodiments are for explanation purposes only and are not intended to limit the scope of the present disclosure.

Example Embodiment 1

After adding a cerium trivalent precursor (0.1 M) and polyethylene glycol (weight average molecular weight: 600, 0.05 M) as a nonionic compound, an aqueous ammonia solution (0.3 M) was added, and stirring was performed at a speed of 900 rpm for 4 hours to synthesize cerium oxide particles.

After dispersing the synthesized cerium oxide particles so that the content of the synthesized cerium oxide particles was 0.1% by weight, a pH adjuster (acetic acid) was mixed to prepare a polishing slurry composition having a pH of 5.

Example Embodiment 2

After cerium oxide particles were synthesized in the same manner except that 0.1 M of polyethylene glycol was used in Example Embodiment 1, a polishing slurry composition was prepared.

Example Embodiment 3

After cerium oxide particles were synthesized in the same manner except that 0.5 M of polyethylene glycol was used in Example Embodiment 1, a polishing slurry composition was prepared.

Example Embodiment 4

After adding a cerium trivalent precursor (0.1 M) and polyethylene glycol (weight average molecular weight: 2,000, 0.1 M), an aqueous ammonia solution (0.3 M) was added and stirring was performed at a speed of 900 rpm for 4 hours to synthesize cerium oxide particles.

After dispersing the synthesized cerium oxide particles so that the content of the synthesized cerium oxide particles was 0.1% by weight, a pH adjuster (acetic acid) was mixed to prepare a polishing slurry composition having a pH of 5.

Example Embodiment 5

After cerium oxide particles were synthesized in the same manner except that the stirring time was changed to 8 hours in Example Embodiment 4, a polishing slurry composition was prepared.

Example Embodiment 6

After cerium oxide particles were synthesized in the same manner except that the stirring time was changed to 12 hours in Example Embodiment 4, a polishing slurry composition was prepared.

Example Embodiment 7

After cerium oxide particles were synthesized in the same manner except that the nonionic compound was changed to polyglycerin (weight average molecular weight: 310, 0.1 M) in Example Embodiment 1, a polishing slurry composition was prepared.

Example Embodiment 8

After cerium oxide particles were synthesized in the same manner except that the nonionic compound was changed to polyvinyl alcohol (weight average molecular weight: 500, 0.1 M) in Example Embodiment 1, a polishing slurry composition was prepared.

Example Embodiment 9

After cerium oxide particles were synthesized in the same manner except that the nonionic compound was changed to dextrin (0.1 M) in Example Embodiment 1, a polishing slurry composition was prepared.

Comparative Example 1

After adding a cerium trivalent precursor (0.1 M) and an aqueous ammonia solution (0.3 M), stirring was performed at a speed of 900 rpm for 4 hours to synthesize cerium oxide particles.

After dispersing the synthesized cerium oxide particles so that the content of the synthesized cerium oxide particles was 0.1% by weight, a pH adjuster (acetic acid) was mixed to prepare a polishing slurry composition having a pH of 5.

Comparative Example 2

After cerium oxide particles were synthesized in the same manner except that the stirring time was changed to 8 hours in Comparative Example 1, a polishing slurry composition was prepared.

Comparative Example 3

After cerium oxide particles were synthesized in the same manner except that the stirring time was changed to 12 hours in Comparative Example 1, a polishing slurry composition was prepared.

Comparative Example 4

After adding a cerium trivalent precursor (0.1 M) and polyethyleneimine (weight average molecular weight: 610, 0.1 M), an aqueous ammonia solution (0.3 M) was added and stirring was performed at a speed of 900 rpm for 4 hours to synthesize cerium oxide particles.

After dispersing the synthesized cerium oxide particles so that the content of the synthesized cerium oxide particles was 0.1% by weight, a pH adjuster (acetic acid) was mixed to prepare a polishing slurry composition having a pH of 5.

Comparative Example 5

After adding a cerium trivalent precursor (0.1 M) and polyacrylic acid (weight average molecular weight: 600, 0.1 M), an aqueous ammonia solution (0.3 M) was added and stirring was performed at a speed of 900 rpm for 4 hours to synthesize cerium oxide particles.

After dispersing the synthesized cerium oxide particles so that the content of the synthesized cerium oxide particles was 0.1% by weight, a pH adjuster (acetic acid) was mixed to prepare a polishing slurry composition having a pH of 5.

Evaluation of Agglomeration Ratio of Cerium Oxide Particles

The cerium oxide particles were subjected to particle dispersion in a ball milling method, and evaluation was performed in a state in which all dispersion conditions were the same.

(1) In the specific surface area of the abrasive particles, an isothermal adsorption line graph of the cerium oxide particles was obtained using nitrogen gas adsorption according to the Brunauer-Emmett-Teller (BET) method, and the specific surface areas of cerium oxide nanoparticles were calculated using the Langmuir formula. Next, the primary particle sizes were calculated by substituting the specific surface areas calculated by BET into Equation 2. The results are shown in Tables 1 and 2.

(2) Particle dispersion was performed under the same milling conditions, and the secondary particle sizes of the dispersed particles were measured through a particle size analysis method using the dynamic light scattering (DLS) method under the same conditions. The results are shown in Tables 1 and 2.

The agglomeration ratios were calculated by substituting the primary particle sizes and secondary particle sizes of Tables 1 and 2 into Equation 1. The results are shown in Tables 1 and 2.

$$A = [\text{Secondary particle size}]/[\text{Primary particle size}] \quad \text{[Equation 1]}$$

$$S_0 = \frac{3}{rp} \text{cm}^2/g \quad \text{[Equation 2]}$$

In Equation 1

For the primary particle sizes, r in Equation 2 is a radius value, and the diameter is calculated using this.

The secondary particle sizes are values measured by the dynamic light scattering (DLS) method.

In Equation 2, $S_0$ is a specific surface area, r is a radius of the particles, p is a density of the material, and a value of 7.22 was substituted.

Zeta Potential Evaluation

The zeta potentials of the polishing slurry compositions were measured with STABINO equipment, and the results are shown in Tables 1 and 2.

Evaluation of Polishing Properties

The PETEOS-containing substrates were polished under the polishing conditions as described below using the polishing slurry compositions of Example Embodiments and Comparative Examples.

[Polishing Conditions]
(1) Polishing equipment: ST #01 (KCT)
(2) Carrier rpm: 60/63
(3) Wafer Pressure: 2 psi
(4) Flow rate (ml/min): 200
(5) Pad: IC 1000
(6) Time: 60 s
(7) R-ring pressure: 4.5 psi In order to evaluate the polishing properties, the polishing rates were measured after polishing the PETEOS wafer substrates using the polishing slurry compositions according to Example Embodiments and Comparative Examples, and the results are shown in Table 1.

TABLE 1

| Classification | Example Embodiments | | | | | | | | |
|---|---|---|---|---|---|---|---|---|---|
| | 1 | 2 | 3 | 4 | 5 | 6 | 7 | 8 | 9 |
| Specific surface area (m²/g) | 141.52 | 138.52 | 135.23 | 145.32 | 86.64 | 48.19 | 131.72 | 139.87 | 133.25 |
| Primary particle size (nm) | 5.88 | 6.00 | 6.16 | 5.72 | 9.6 | 17.26 | 6.3 | 5.94 | 6.24 |
| Secondary particle size (nm) | 11 | 12 | 12 | 11 | 17 | 35 | 13 | 11 | 13 |
| Agglomeration ratio (Equation 1) | 1.87 | 2.00 | 1.95 | 1.92 | 1.77 | 2.03 | 2.06 | 1.85 | 2.08 |
| PETEOS Removal rate (Å/min) | 3,875 | 3,758 | 3,598 | 4,015 | 3,845 | 3,258 | 3,024 | 3,854 | 3,751 |
| Zeta potential (mV) | 61 (+) | 55 (+) | 50 (+) | 47 (+) | 65 (+) | 61 (+) | 58 (+) | 55 (+) | 54 (+) |

TABLE 2

| Classification | Comparative Example | | | | |
|---|---|---|---|---|---|
| | 1 | 2 | 3 | 4 | 5 |
| Specific surface area (m²/g) | 141.52 | 80.52 | 50.12 | 133.25 | 140.23 |
| Primary particle size (nm) | 5.88 | 10.34 | 16.6 | 6.24 | 5.94 |
| Secondary particle size (nm) | 35 | 45 | 53 | 12 | 11 |
| Agglomeration ratio (Equation 1) | 5.95 | 4.35 | 3.19 | 1.92 | 1.85 |
| PETEOS Removal rate (Å/min) | 2,125 | 1,580 | 821 | 1,464 | 53 |
| Zeta potential (mV) | 61 (+) | 58 (+) | 60 (+) | 72 (+) | 42 (−) |

Referring to Tables 1 and 2, polishing slurry compositions comprising abrasive particles having an agglomeration ratio between 1.5 and 2.5 calculated by the ratio of the primary particle sizes calculated by BET and the secondary particle sizes calculated by the DLS method are provided, and it can be confirmed that the polishing rates for the polishing target film are exceptionally increased compared to the Comparative Examples that deviate from the above values.

Although the above-mentioned example embodiments have been described by limited Example Embodiments, those skilled in the art may apply various modifications and alterations from the above-described description. For example, appropriate results can be achieved although described techniques are carried out in a different order from a described method, and/or described elements are combined or mixed in a different form from the described method or replaced or substituted with other elements or equivalents. Therefore, other embodiments, other Example Embodiments, and equivalents to patent claims belong to the scope of the patent claims to be described later.

What is claimed is:

1. Cerium oxide abrasive particles comprising:
an element cerium; and
a modifier,
wherein the modifier includes at least one selected from the group consisting of polyethylene glycol (PEG), polyglycerol, polyvinyl alcohol (PVA) and dextrin, and
an agglomeration ratio (A) according to the following Equation 1 is 1.5 to 2.5:

$$A = [\text{Secondary particle size}]/[\text{Primary particle size}] \quad [\text{Equation 1}]$$

In Equation 1, the primary particle size is an r value of Equation 2, and
the secondary particle size is a value measured by a dynamic light scattering (DLS) method, $$S_0 = \frac{3}{rp} \text{cm}^2/g \quad [\text{Equation 2}]$$

In Equation 2, $S_0$ is a specific surface area of the cerium oxide abrasive particles, r is a radius of the cerium oxide abrasive particles, and p is a density of the cerium oxide abrasive particles,
wherein the primary particle size according to Equation 2 above is 25 nm or less, and
the secondary particle size of the cerium oxide abrasive particles is 5 nm to 50 nm.

2. Cerium oxide abrasive particles of claim 1,
wherein the cerium oxide abrasive particles have a specific surface area (BET) of 31 m²/g or more.

3. Cerium oxide abrasive particles of claim 1,
wherein the cerium oxide abrasive particles have a density of 6.7 g/cm³ to 7.7 g/cm³.

4. Cerium oxide abrasive particles of claim 1,
wherein the modifier is contained in a concentration of 0.01 M to 1 M.

5. Cerium oxide abrasive particles of claim 1,
wherein the molar ratio of the element cerium to the modifier is 1:0.1 to 1:1.

6. A polishing slurry composition comprising the cerium oxide abrasive particles of claim 1.

7. The polishing slurry composition of claim 6,
wherein the cerium oxide abrasive particles are contained in an amount of 0.01% by weight to 5% by weight in the slurry composition.

8. The polishing slurry composition of claim 6, further comprising, a pH adjuster.

9. The polishing slurry composition of claim 8,
wherein the pH adjuster includes an acidic material including at least one selected from the group consisting of hydrochloric acid, sulfuric acid, nitric acid, nitrous acid, persulfuric acid, sulfurous acid, hyposulfurous acid, boronic acid, phosphoric acid, phosphorous acid, hypophosphorous acid, superphosphoric acid, perchloric acid, chlorous acid, hypochlorous acid, bromic acid, bromous acid, hypobromous acid, perbromic acid, iodic acid, hypoiodous acid, periodic acid, hydrogen fluoride, boron trifluoride, tetrafluoroboric acid, hydrofluoric acid, formic acid, malonic acid, maleic acid, oxalic acid, adipic acid, citric acid, acetic acid, propionic acid, fumaric acid, salicylic acid, pimelinic acid, benzoic acid, succinic acid, phthalic acid, butyric acid, glutaric acid, glutamic acid, glycolic acid, lactic acid, aspartic acid, tartaric acid, and salts thereof.

10. The polishing slurry composition of claim 6,
wherein the polishing slurry composition has a pH of 2 to 11.

11. The polishing slurry composition of claim 6,
wherein the polishing slurry composition has a positive zeta potential.

* * * * *